United States Patent
Chung et al.

(10) Patent No.: US 10,437,737 B2
(45) Date of Patent: Oct. 8, 2019

(54) DATA STORAGE DEVICE

(71) Applicant: Silicon Motion, Inc., Jhubei, Hsinchu County (TW)

(72) Inventors: Chien-Chung Chung, Taipei (TW); Kuan-Hui Li, Chiayi (TW); Yi-Chang Huang, Tainan (TW)

(73) Assignee: SILICON MOTION, INC., Jhubei, Hsinchu County (TW)

( * ) Notice: Subject to any disclaimer, the term of this patent is extended or adjusted under 35 U.S.C. 154(b) by 20 days.

(21) Appl. No.: 15/869,867

(22) Filed: Jan. 12, 2018

(65) Prior Publication Data
US 2018/0373643 A1    Dec. 27, 2018

(30) Foreign Application Priority Data

Jun. 27, 2017   (TW) .............................. 106121683 A

(51) Int. Cl.
*G06F 12/1009*   (2016.01)
*G06F 12/02*   (2006.01)

(52) U.S. Cl.
CPC ...... *G06F 12/1009* (2013.01); *G06F 12/0246* (2013.01); *G06F 2212/1041* (2013.01); *G06F 2212/2022* (2013.01); *G06F 2212/657* (2013.01); *G06F 2212/7201* (2013.01); *G06F 2212/7206* (2013.01)

(58) Field of Classification Search
CPC ......... G06F 12/1009; G06F 2212/1041; G06F 2212/2022; G06F 2212/657
See application file for complete search history.

(56) References Cited

U.S. PATENT DOCUMENTS

| 2007/0150694 | A1 | 6/2007 | Chang et al. |
| 2011/0099326 | A1 | 4/2011 | Jung et al. |
| 2013/0326169 | A1 | 12/2013 | Shaharabany et al. |
| 2018/0074708 | A1* | 3/2018 | Gerhart ................... G06F 3/064 |

FOREIGN PATENT DOCUMENTS

CN    103455437 A    12/2013

* cited by examiner

*Primary Examiner* — Eric Cardwell
(74) *Attorney, Agent, or Firm* — McClure, Qualey & Rodack, LLP

(57) ABSTRACT

A data storage device includes a flash memory and a flash memory controller. The flash memory controller operates the flash memory to store data, and stores a mapping table to record the mapping information between a plurality of logical addresses and a plurality of physical addresses of the flash memory. The mapping table is divided into a plurality of groups. Some of the groups are categorized into a first type of trim group and some of the logical addresses of each of the groups of the first type of trim group are included in a trim command. The flash memory controller performs the trim on the groups of the first type of trim group.

12 Claims, 9 Drawing Sheets

FIG. 2

| H2F | Logical Address | Physical Address |
|---|---|---|
| | 1 | (BLK#,U#) |
| | ... | ... |
| | j | (BLK#,U#) |
| | (j+1) | (BLK#,U#) |
| | ... | ... |
| | 2j | (BLK#,U#) |
| | ... | ... |

H2F_H#1: rows 1 through j
H2F_H#2: rows (j+1) through 2j
...

Trim Command

Trim Request #1: | H#5 | H#6 | H#7 |

Trim Request #2: | H#3 | H#4 | H#5 |

Trim Request #3: | H#6 | H#7 |

Trim Request #4: | H#3 | H#4 |

⋮

FIG. 3

DATA STORAGE DEVICE

CROSS REFERENCE TO RELATED APPLICATIONS

This Application claims priority of Taiwan Patent Application No. 106121683, filed on Jun. 27, 2017, the entirety of which is incorporated by reference herein.

BACKGROUND OF THE INVENTION

Field of the Invention

The present invention relates to data storage devices, and in particular to space-trimming of non-volatile memory.

Description of the Related Art

There are various non-volatile memories used in data storage devices for long-term data storage, such as flash memory, magnetoresistive RAM, ferroelectric RAM, resistive RAM, spin transfer torque-RAM (STT-RAM), and so on.

The performance of a data storage device is limited due to the operational characteristics of non-volatile memory. How to enhance the performance of data storage devices is an important issue in this area of technology.

BRIEF SUMMARY OF THE INVENTION

An integrated trim technology is disclosed by the present invention. When the data storage device cannot accomplish trimming within a period based on the trim command of the host, it can complete a portion of trimming at high priority. Afterwards, another portion of trimming will be executed without affecting the normal operation of the data storage device so that the host can access data in the data storage device smoothly.

A data storage device is provided by the present invention. The data storage device includes a flash memory and a flash memory controller. The flash memory controller is utilized to operate the flash memory to store data, store a mapping table to record mapping information of a plurality of physical addresses of the flash memory and a plurality of logical addresses, and divide the mapping table into a plurality of groups. A portion of the groups is first-type trim groups, a portion of the logical addresses recorded by each group of first-type trim groups are included by a trim command, and the flash memory controller performs trimming on the first-type trim groups. Another portion of the groups are the second-type trim groups, and all of the logical addresses recorded by each group of second-type trim groups are included by a trim command.

A data storage device is provided by the present invention. The data storage device includes a flash memory and a flash memory controller. The flash memory controller is utilized to operate the flash memory to store data, store a mapping table to record mapping information of a plurality of physical addresses of the flash memory and a plurality of logical addresses, and divide the mapping table into a plurality of groups. A portion of the groups are the second-type trim groups, and all of the logical addresses recorded by each group of second-type trim groups are included by a trim command. When a garbage collection process is executed, if valid data of a source block belongs to some groups of the second-type trim groups, the flash memory controller performs trimming on some of the groups.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein:

FIG. 2 depicts a mapping table H2F with the logical address (LBA or GHP) as the index;

FIG. 3 is provided for discussion of a trim command;

DETAILED DESCRIPTION OF THE INVENTION

The following description shows exemplary embodiments of carrying out the invention. This description is made for the purpose of illustrating the general principles of the invention and should not be taken in a limiting sense. The scope of the invention is best determined by reference to the appended claims.

There are various forms of non-volatile memory for long-term data retention, such as flash memory, magnetoresistive RAM, ferroelectric RAM, resistive RAM, spin transfer torque-RAM (STT-RAM) and so on. The following discussion uses flash memory in particular as an example.

Today, flash memory is usually used as a storage medium in a data storage device, such as a memory card, a universal serial bus (USB) flash device, a solid state disk (SSD, NVMe, M.2, U.2), and so on. In an exemplary embodiment, a flash memory and a controller may be wrapped together as a multi-chip package named eMMC.

A data storage device using a flash memory as a storage medium may be applied to a variety of electronic devices. The electronic device may be a smartphone, a wearable device, a tablet computer, a virtual reality device, etc. A central processing unit (CPU) in an electronic device may be regarded as a host that operates the connected data storage device.

Figure 1A:
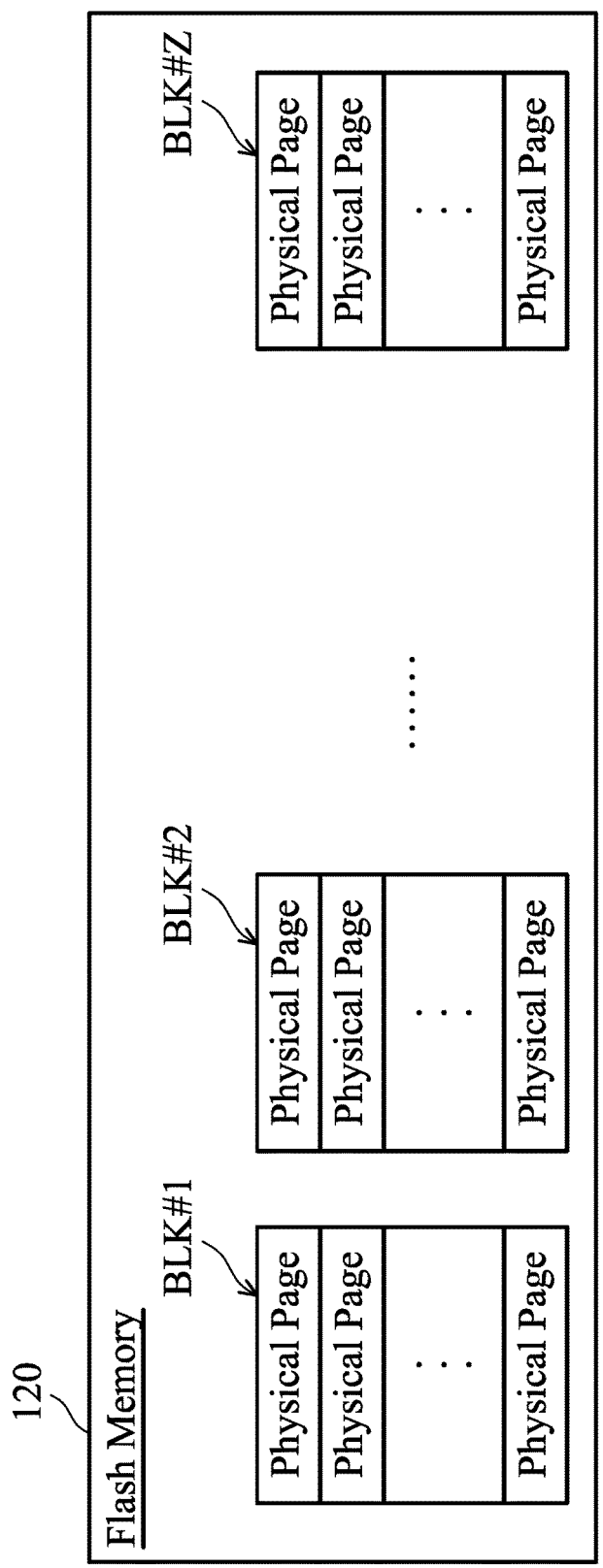
FIGS. 1A and 1B illustrate the physical space planning of a flash memory 120 in accordance with an embodiment of the disclosure.
Figure 1B:
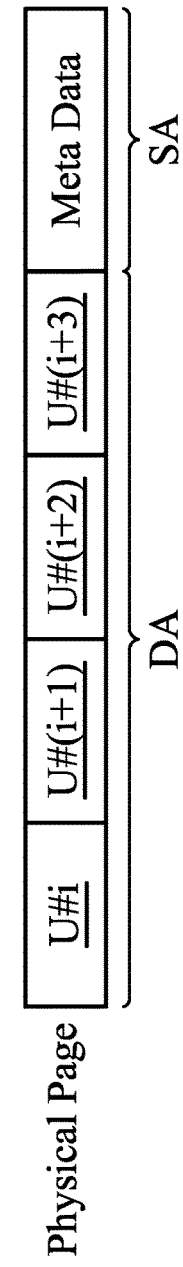

FIGS. 1A and 1B illustrate the physical space planning of a flash memory 120 in accordance with an embodiment of the disclosure. As shown in FIG. 1A, the storage space of the flash memory 120 is divided into a plurality of blocks (physical blocks) BLK#1, BLK#2 BLK#Z, etc., where Z is a positive integer. Each physical block includes a plurality of physical pages, for example: 256 physical pages.

One physical page is further discussed in FIG. 1B. Each physical page includes a data area DA, and a spare area SA. The data area DA may be divided into a plurality of storage units U#i, U#(i+1), U#(i+2), and U#(i+3) to be separately allocated for data storage of the issued logical addresses. There are many forms of logical addresses can be related to the allocated storage units. For example, the allocated storage units may correspond to data storage of logical block addresses (LBAs) or global host pages (GHPs). In an exemplary embodiment, the data area DA is 16 KB and is divided into four 4 KB storage units U#i, U#(i+1), U#(i+2), and U#(i+3). Each 4 KB storage unit may be allocated to store data indicated by eight logical block addresses (e.g. LBA#0 to LBA#7) or one GHP. The spare area SA is used to store metadata like the mapping information showing what logical addresses used at the host side that the data in the storage units U#i, U#(i+1), U#(i+2) and U#(i+3) corresponds to.

However, the mapping information recorded in the spare area SA is not always valid. The flash memory 120 has a special physical property: the updated data is not overwritten on the storage space of old data. Instead, the updated data is written to a free space and the old data in the original space is invalidated. A mapping table (e.g. a table H2F showing the mapping from logical addresses to physical space) has to be dynamically managed for the flash memory 120.

Figure 2:
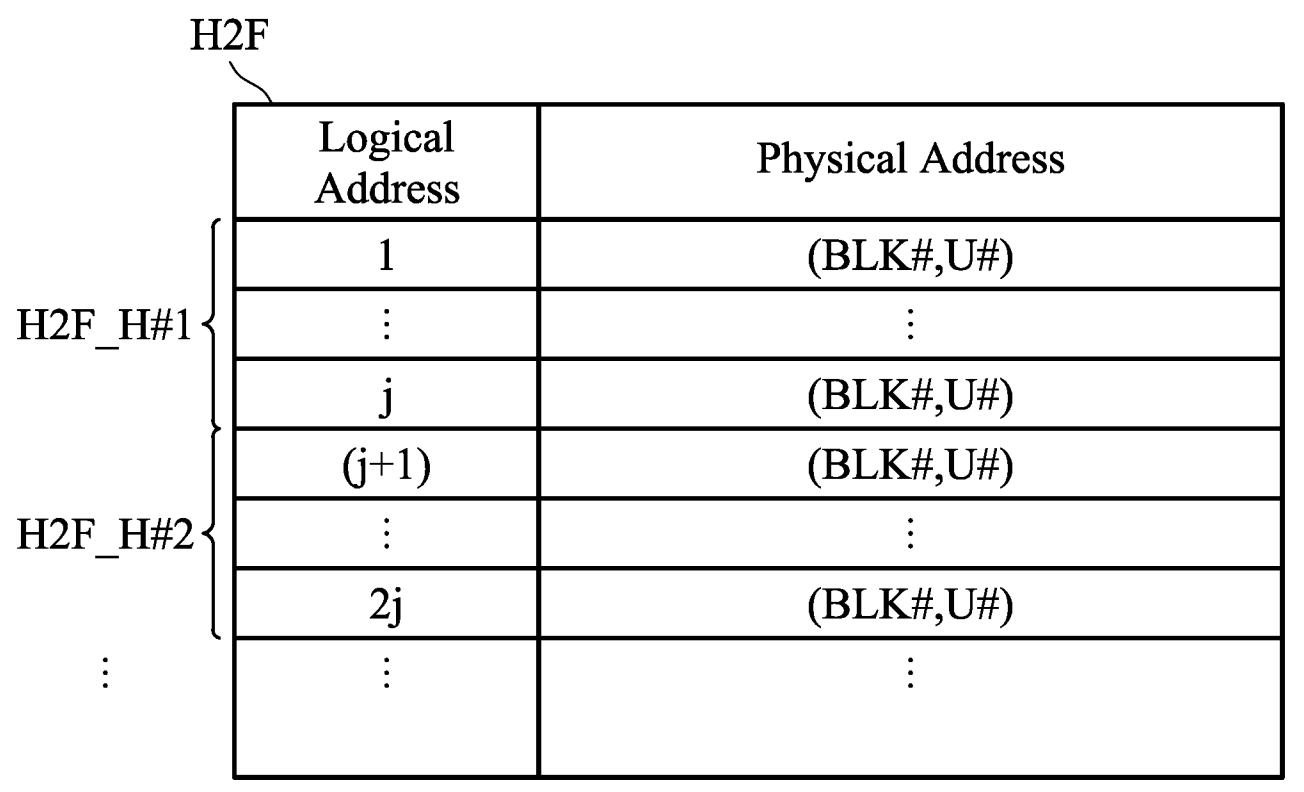

FIG. 2 depicts a mapping table H2F with the logical address (LBA or GHP) as the index. In the mapping table H2F, how the storage space in the flash memory 120 is allocated for storing the data of the different logical addresses is shown. A block number BLK# and a storage unit number U# are presented to show the physical address that a logical address maps to. For a huge storage space, the mapping table H2F may be further divided into host block-mapping tables H2F_H#1, H2F_H#2 . . . H2F_H#Z corresponding to host blocks H#1, H#2 . . . H#Z, where Z is an integer number.

In an exemplary embodiment, each host block-mapping table is 64 KB (recorded in four consecutive physical pages) to show mapping information of 8K of data. One host block-mapping table may correspond to a section of logical addresses, like GPH#0 . . . #8191, GPH#8192 . . . #16383, GPH#16384 . . . #24575, GPH#24576 . . . #32767, or GPH#32768 . . . #40959, and so on. After being updated, the host block-mapping tables H2F_H#1, H2F_H#2 . . . H2F_H#Z may be stored in a specific physical block (e.g. a system block). In order to speed up the reading of the host block-mapping tables H2F_H#1, H2F_H#2 . . . H2F_H#Z, a list of indicators or a high-level mapping table may be provided to show where the different host block-mapping tables H2F_H#1, H2F_H#2 . . . H2F_H#Z are stored in the system block. The flash memory 120 is operated according to the mapping table H2F.

The trim command is utilized to enhance the performance of the data storage device and complies with the operating feature of the flash memory 120. The host can issue a trimming command to the data storage device to inform that one or some logical addresses (the target logical address) could be removed (which means that the data of the target logical address is no longer invalid). Accordingly, in the data storage device, the records of one or some logical addresses may be removed or amended from the mapping table H2F. Afterwards, the physical space with only invalid data remaining from the target logical address may be recycled or reused by a garbage collection.

FIG. 3 is provided for discussion of a trimming command. There may be up to 500 trimming requests issued in one trimming command. Referring to FIG. 3, host blocks involved in the trimming requests are listed here in sequence: H#5, H#6, H#7, H#3, H#4, H#5, H#6, H#7, H#3, H#4. Each trimming request may indicate at least one logical address section to be trimmed by data length and the starting logical address, or by the starting and ending logical addresses. In the mapping table H2F, the mapping information that indicates the logical address sections may be removed, or the physical addresses corresponding to the logical addresses could be changed to a predefined value, e.g. 0xFFFF or 0x0000 in order to interrupt or remove the mapping from all logical addresses in the above logical address section to the flash memory 120.

Figure 4:
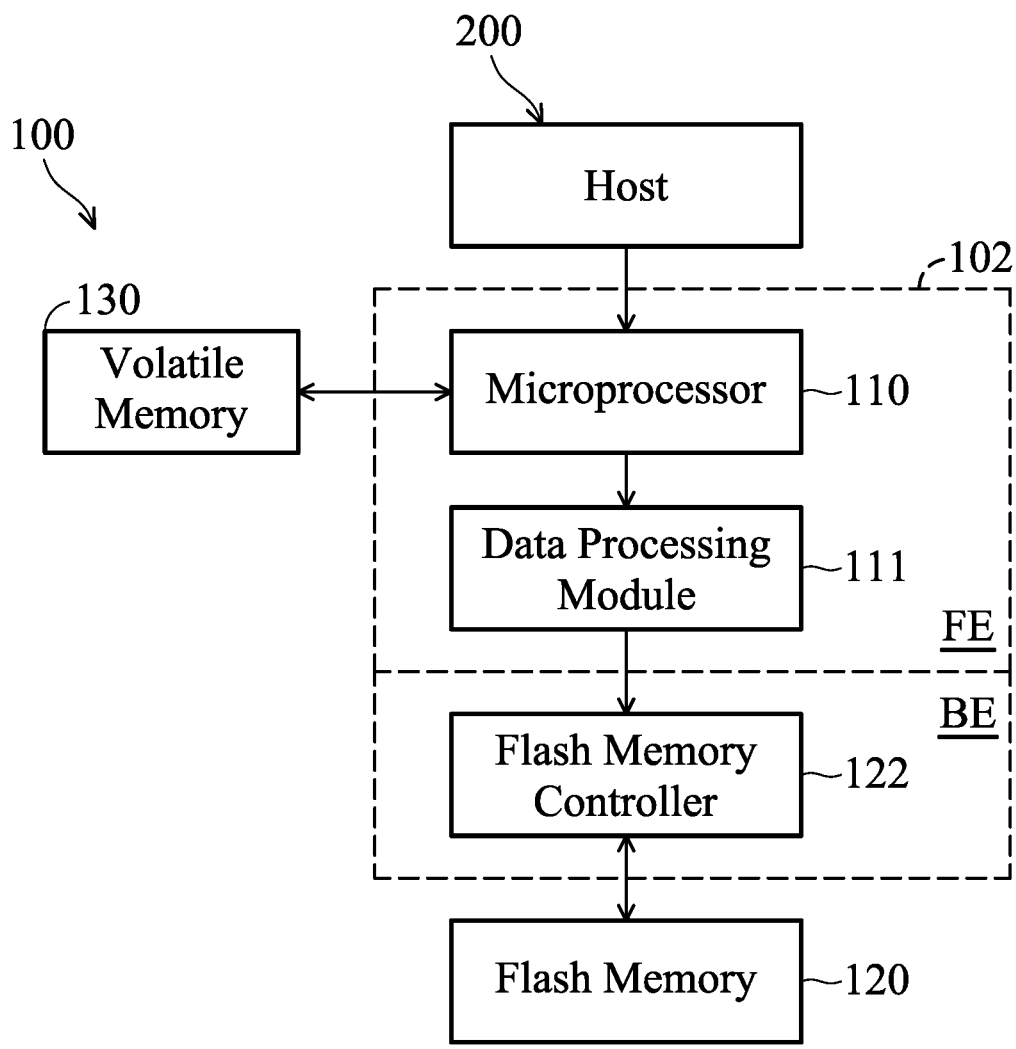
FIG. 4 is a block diagram depicting a data storage device 100 in accordance with an exemplary embodiment of the disclosure.

FIG. 4 is a block diagram depicting a data storage device 100 in accordance with an exemplary embodiment of the disclosure. The data storage device 100 includes a controller 102, a flash memory 120 and a volatile memory 130. The controller 102 includes a microprocessor 110, a data processing module 111, a flash memory controller 122. Specifically, the microprocessor 110 and data processing module 111 are arranged on the front end FE of the controller 102. The flash memory controller 122 is arranged on the back end BE of the controller 102. The front end FE is responsible for communication between the data storage device 100 and a host 200. The back end BE is responsible for operating the flash memory 120 so that the host 200 can write or read data for the flash memory 120. According to such a two-layer control structure, the communication between the host 200 and the data storage device 100 is specifically managed at the front end FE. Thus, the throughput between the host 200 and the data storage device 100 is considerably improved, and the complexity of debugging is also reduced.

In addition, the host 200 is connected to the data storage device 100A via a bus interface. The commands that comply with the NVMe standard (referred to as external commands in the following descriptions) which are issued from the host 200 are transmitted to the microprocessor 110 to be scheduled and then transmitted to the back end BE. In other words, the microprocessor 110 communicates with the host 200 through the bus interface, and the communication between the data storage device 100 and the host 200 can be simplified. The external commands are scheduled by the microprocessor 110 according to the sequence of setting or receiving priorities. In one embodiment, the microprocessor 110 may support an NVMe command protocol, an ATA (advanced technology attachment) command protocol, a PATA (parallel ATA) command protocol, a SATA (serial ATA) command protocol, a SCSI (small computer system interface), an eMMC or UFS.

The process for writing data is that the microprocessor 110 transmits the data 10 through the data processing module 111 to the flash memory controller 122. Specifically, the data processing module 111 executes encryptions, generates a parity code and executes randomization for the data 10. For example, the above encryption includes the Advanced Encryption Standard (AES) or the RSA encryption. Afterwards, the data processing module 111 generates an additional correction code based on the encrypted data 10 for providing protections on the accuracy of the data 10. The above correction includes the CRC correction or the ECC correction. Furthermore, the randomization is performed so that the distribution of value (i.e., 0 or 1) of the randomized data 10 is more average than before. Finally, the flash memory controller 122 transmits the randomized data 10 to the flash memory 120, and stores the logical address and physical address of the randomized data 10 to the mapping table H2F.

In one embodiment, the mapping table H2F could be stored by the flash memory controller 122. The trim command could be transmitted by the host to the data storage device 100 for indicating the removal of one or several target logical addresses. Afterwards, the one or several target logical addresses are removed from the mapping table H2F or the target physical address corresponding to target logical address is amended to be a specific value (such as 0xFFFF) by the flash memory controller 122 of the data storage device 100 directly or indirectly to complete the execution of the trim command. The mapping table H2F could be updated dynamically corresponding to the trim command of the host 200.

Figure 5:
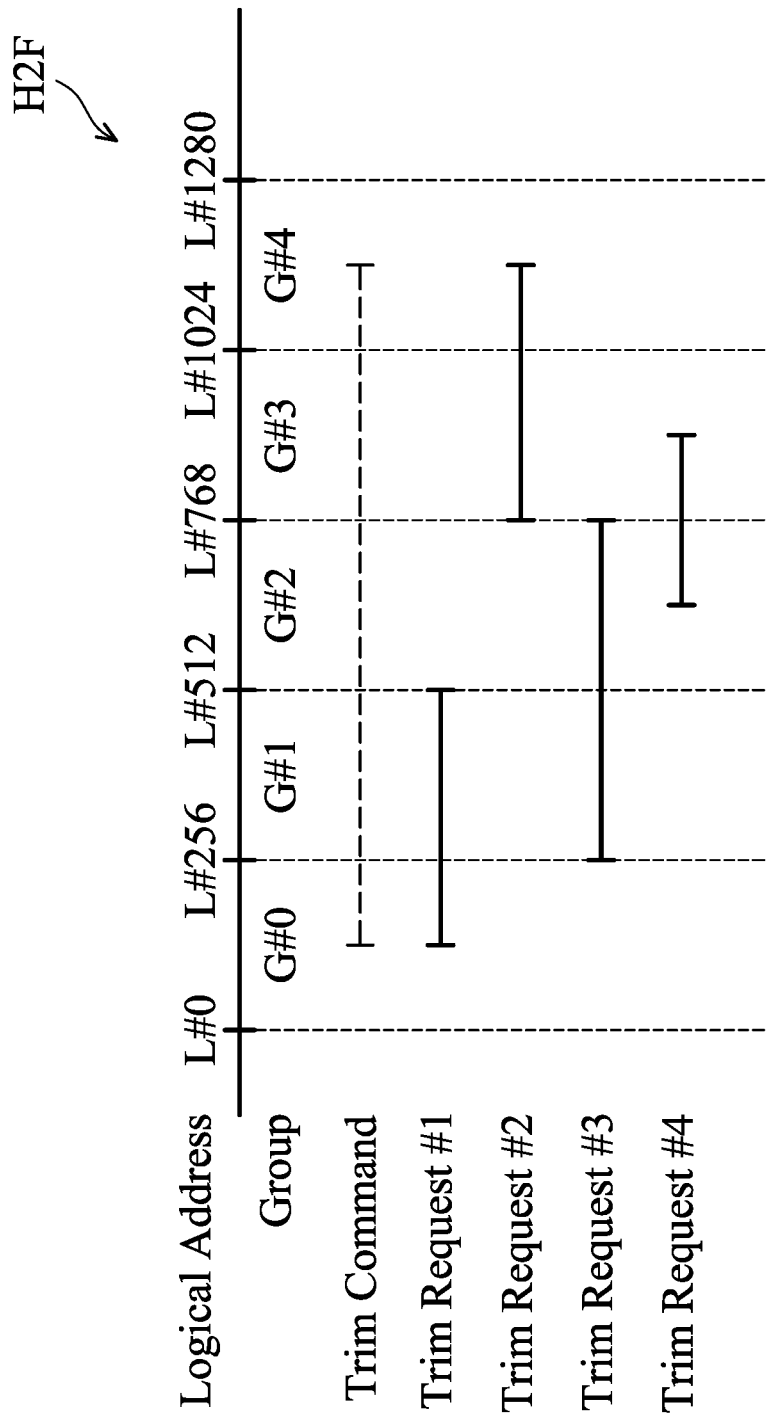
FIG. 5 is a block diagram depicting the grouping corresponding to a trim command in accordance with an exemplary embodiment of the disclosure.

FIG. 5 is a block diagram depicting the grouping corresponding to a trim command in accordance with an exemplary embodiment of the disclosure. In one embodiment, the flash memory controller 122 stores a mapping table H2F to record the mapping information between the logical address of the host 200 and the physical address of the flash memory 120, and it divides the mapping table H2F into several trim groups G#0~G#N according to the sequence of the logical addresses. As shown in FIG. 5, the mapping table H2F records the logical addresses L#0~L#1279 with the amount of 1280 in total, which are 1280 mapping information between the logical address and the physical address of the flash memory 120. The mapping table H2F is divided into several trim groups G#0~G#4 by the flash memory controller 122 based on the sequence of the logical addresses. The size of each trim group is fixed, such as 1K Bytes. Specifically, the size of 4 B is utilized to record a mapping information between the logical address and the physical address of the flash memory 120. Based on the value of logical address, the logical addresses L#0~L#255 belong to the trim group G#0, the logical addresses L#256~L#511 belong to the trim group G#1, the logical addresses L#512~L#767 belong to the trim group G#2, the logical addresses L#768~L#1023 belong to the trim group G#3, and the logical addresses L#1024~L#1079 belong to the trim group G#4.

Afterwards, the controller 102 receives the trim command transmitted by the host 200. The trim command includes several trim requests #1~#4. For example, in the embodiment of FIG. 5, the logical addresses L#100~L#1150 are covered by the trim command. The trim command invalidates a portion of records of the trim commands G#0 and G#4 (which are called the first-type trim group), and invalidates all records of the trim groups G#1~G#3 (which are called the second-type trim group). In other words, the trim command covers a portion of the trim commands G#0 and G#4, and all of the trim commands G#1~G#3. Specifically, the trim request #1 includes a portion of the trim command G#0 and all of the trim command G#1, the trim request #2 includes a portion of the trim command G#4 and all of the trim command G#3, the trim request #3 includes all of the trim commands G#1 and G#2, and the trim request #4 includes a portion of the trim commands G#2 and G#3.

In one embodiment, the flash memory controller 122 performs the trim on the trim groups G#0 and G#4 which are partially invalid at high priority. After the trim on the trim groups G#0 and G#4 is completed, the flash memory controller 122 deals with the command from the host 200. After the command is executed, or after the host 200 requires the data storage device 100 to enter the power-saving mode, or after the data storage device 100 is on the power-saving mode, the trim is executed on the trim groups G#1~G#3 sequentially. Because some records rather than all records of the trim groups G#0 and G#4 are invalid, it consumes limited time for trimming the trim groups G#0 and G#4. Therefore, by utilizing the above method, a portion of trim could be accomplished within a limited period by the flash memory controller 122, afterwards, the remaining portion of trim is scheduled in sequence. Accordingly, the command control or data access for the host 200 to the data storage device 100 could be prevented from being affected and interfered.

In another embodiment, the trim requests are integrated by the flash memory controller 122 to determine whether it is the first-type trim group or the second-type trim group. For example, the trim requests #1 and #2 are integrated to obtain the first-type trim groups G#0 and G#4 and the second-type trim groups G#1 and G#3. Afterwards, the trim requests #1, #2 and #3 are integrated to obtain the first-type trim groups G#0 and G#4 and the second-type trim groups G#1, G#2 and G#3. Finally, the trim requests #1, #2, #3 and #4 are integrated to obtain the first-type trim groups G#0 and G#4 and the second-type trim groups G#1, G#2 and G#3. Because the repeated range of the trim requests has been integrated, the number of trim execution could be reduced effectively.

In addition, a trim loop-up table is stored by the flash memory controller 122 to record several values. Each of the value is mapped to each of the trim groups to record whether the trim is completed or not. For example, the format of the trim look-up table is shown below:

| G#0 | G#1 | G#2 | G#3 | G#4 |
| --- | --- | --- | --- | --- |
| 0 | 1 | 1 | 1 | 0 |

In other words, the value of 1 or 0 is stored by the trim look-up table. The trim look-up table corresponds to the trim groups, and the trim groups correspond to a portion of content of the mapping table H2F. Each of the trim groups G#0~G#4 has a value stored in the trim loop-up table. The value 1 indicates that the trim group needs trim but has not been trimmed. The value 0 indicates that the trim group has been trimmed or that it does not need trimming. Furthermore, because the first-type trim group has been trimmed in the first period of time, the value of the first-type trim group is "0". Whenever the trim is performed on the data storage device 100 or the data storage device 100 receives a trim command, the trim look-up table and the mapping table H2F needs immediate updating.

In some embodiments, an index is utilized by the flash memory controller 122 to cooperate with the trim look-up table, indicate the order of trim groups for performing the trim and record the amount of trim groups which need trimming. For example, in the above trim look-up table, there are four trim groups which need trimming. Afterwards, trimming is performed for the trim group G#1. After the trim groups G#1 has been trimmed, its value on the trim loop-up table will be amended from 1 to be 0 to indicate that the trimming is completed. Afterwards, the index points out the trim group G#2 to indicate the next trim group to be trimmed, and so on.

Because the trim look-up table merely records a value of 1 or 0, it requires a small storage space and can be stored in the volatile memory 130. Furthermore, by utilizing the trim look-up table of the present invention, the trimming status of each trim group G#0~G#4 of the mapping table H2F could be obtained rapidly. Therefore, the flash memory controller 102 could execute the trimming of some trim groups based on the trim look-up table at its leisure or during a spare period to avoid affecting its normal operations and increase the usage efficiency of the data storage device 100.

In another embodiment, when the first-type trim group has been trimmed, the trim look-up table is generated and stored by the flash memory controller 122. Afterwards, the next time that the data storage device 100 is initiated, the flash memory controller 122 continues to perform the trimming for the second-type trim group based on the trim look-up table. Therefore, by utilizing the data storage method of the present invention, even if an accidental power-off occurs, the trim look-up table can still be used to re-initiate the data storage device 100 and continue to execute the trimming.

Figure 6:
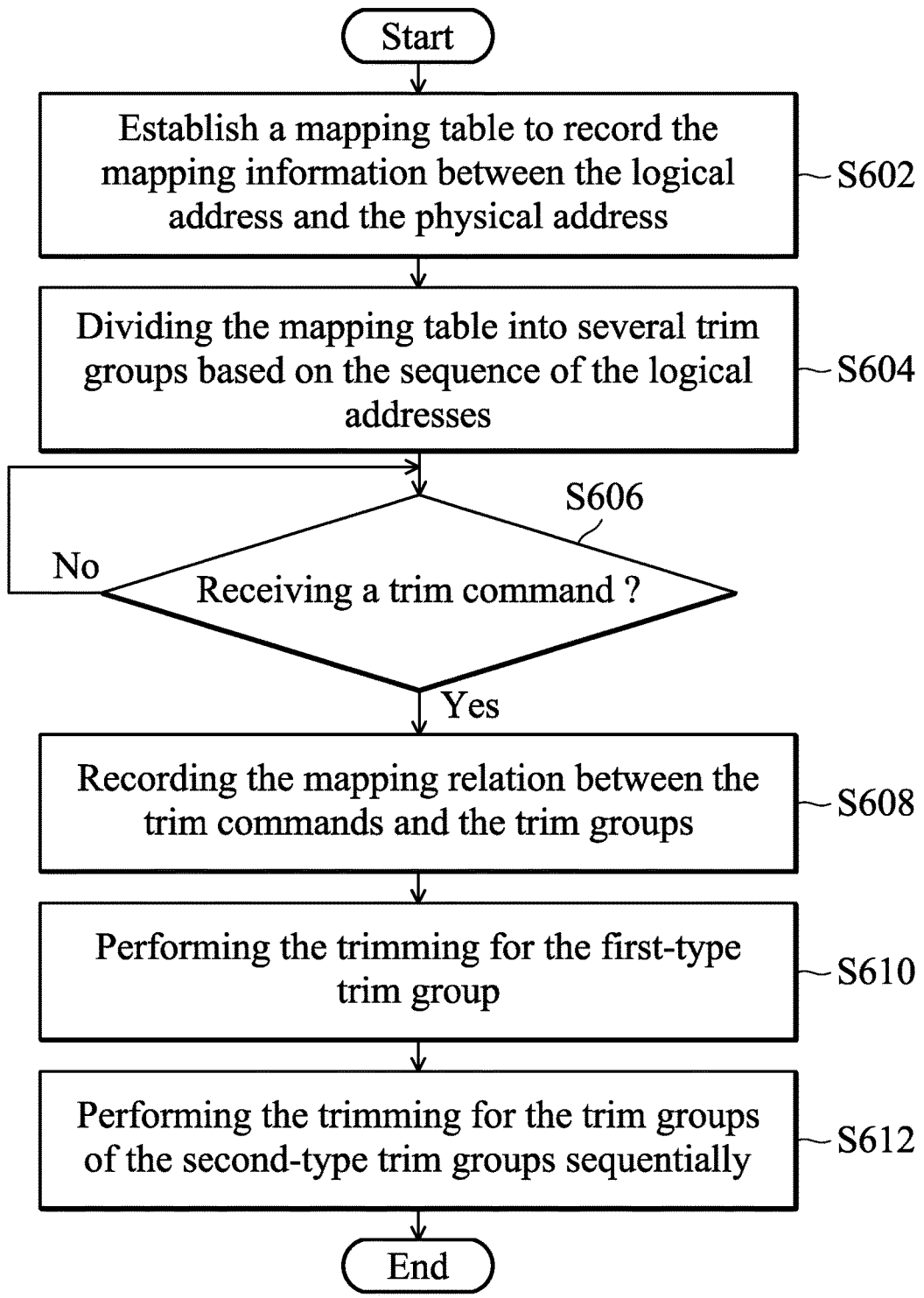
FIG. 6 is a flow chart depicting storage-space trimming in accordance with an exemplary embodiment of the disclosure.

When the host 200 transmits a read command or a write command, the processing method of the data storage device 100 through the trim loop-up table associated with the trim command is illustrated as below. FIG. 6 is a flow chart depicting the trimming in accordance with an exemplary embodiment of the disclosure. Firstly step S602 is executed to establish a mapping table H2F to record the mapping information between the logical address and the physical address. In step S604, the mapping table H2F is divided into several trim groups by the flash memory controller 122 based on the sequence of the logical addresses. For example, 5 trim groups, such as trim groups G#0~G#4, are allocated by the mapping table H2F based on the sequence of the logical addresses.

In step S606, whether a trim command is received or not is determined. The trim command is transmitted from the host 200. If the host 200 does not transmit a trim command, step S606 will be repeated. If the host 200 transmits the trim command, step S608 will be executed to record the mapping relation between the trim commands and the trim groups G#0~G#N. For example, the trim command corresponds to a portion of content of the trim groups G#0 and G#4 (L#100~L#255 and L#1024~L#1150), and the trim groups G#0 and G#4 are called the first-type trim group. The trim command corresponds to all content of the trim groups G#1 to G#3, and the trim groups G#1 to G#4 are called the second-type trim group.

In step S610, the trimming is performed for the first-type trim group. In step S612, the trimming is performed for the trim groups of the second-type trim groups sequentially.

The flash memory controller 122 performs trimming for the first-type trim groups at high priority. Because the first-type trim groups have been trimmed, the trim loop-up table does not record the first-type trim groups. When the trimming of the first-type trim groups is completed, step S612 will be executed by the flash memory controller 122 to perform the trimming for the trim groups of the second-type trim groups sequentially. The second-type trim group includes the trim groups G#1~G#3, whose value is "1" as recorded by the trim look-up table. The index could be utilized by the flash memory controller 122 to point out the "1" of the most front address of the trim look-up table (corresponding to the trim group G#1) or the most back address of the trim look-up table (corresponding to the trim group G#3). The trim group corresponding to the address is the current trim group. When the current trim group has been trimmed, the value of the current trim group on the trim loop-up table will be changed from "1" to "0". Afterwards, the index points out the next address whose value is "1" on the trim look-up table, and the trim group corresponding to the address will the current trim group. For example, the next value of "1" on the trim look-up table corresponds to the trim group G#2, and the trim group G#2 will become the current trim group, and so on.

In addition, because the host 200 could transmit another trim command to the data storage device 100. The trim command requires trimming be performed on the trim groups which have been trimmed or do not need trimming. Therefore, the amount of trim groups that wait for trimming is preferably recorded by the flash memory controller 122 (the amount of the value "1") to confirm that all trim groups which need trimming have been trimmed.

Step S612 is preferably executed in the background mode. It could also be executed by sections. In other words, after the current trim group has been trimmed and before the next current trim group is selected, the flash memory controller 122 could execute the data access command, such as the read command or the write command. After the data access command is executed, the trimming will be performed on the next current trim group until the total amount of trim groups is zero.

Figure 7:
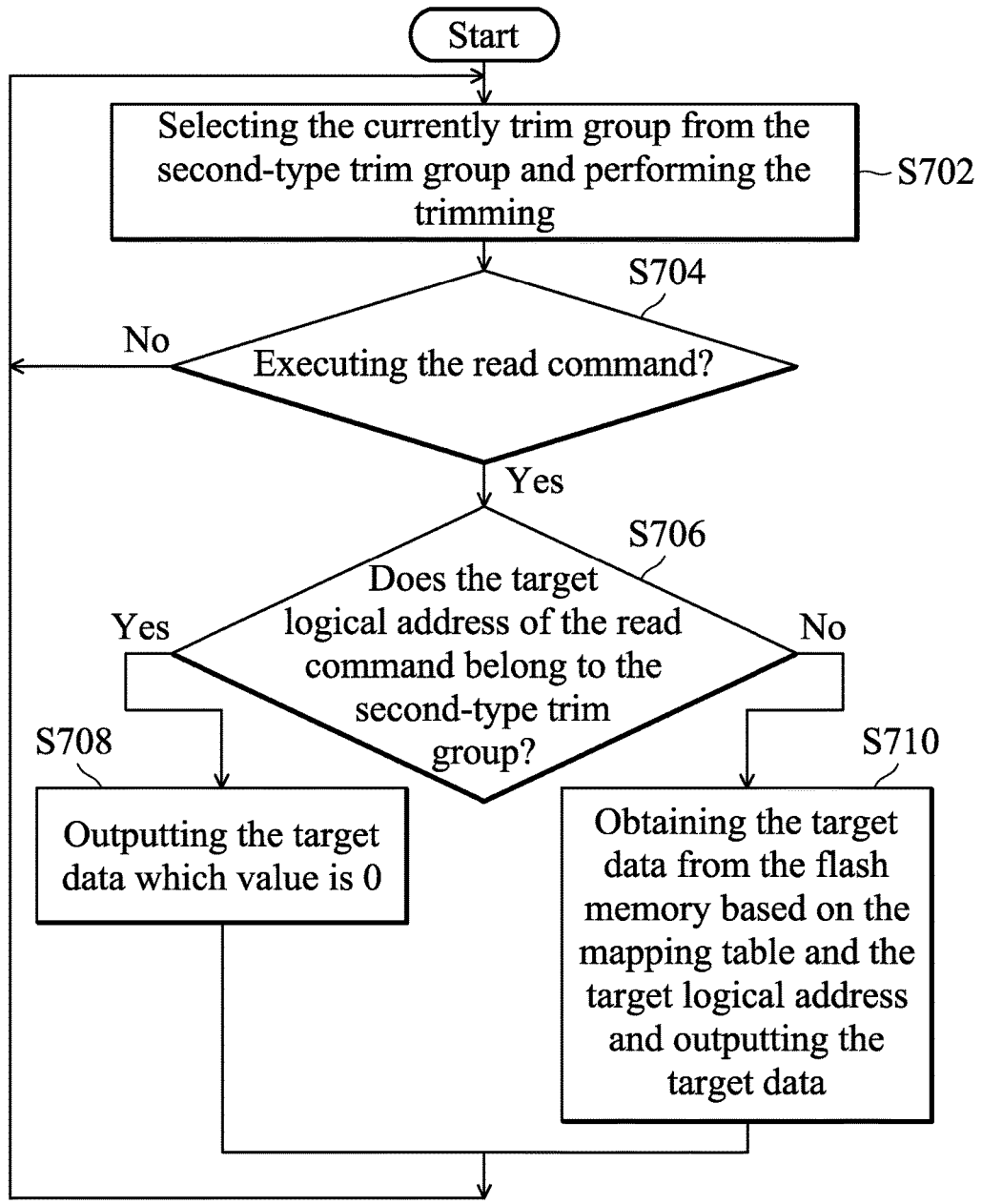
FIG. 7 is a flow chart depicting storage-space trimming in accordance with another exemplary embodiment of the disclosure.

Step S612 could include the following steps as shown in FIG. 7. In step S702, the current trim group is selected from the second-type trim group and trimmed. Afterwards, in step S704, whether the read command is executed or not is determined. The read command is preferably from the host 200, or it could be generated by the garbage collection process or the data moving process. If not, step S702 will be executed. If yes, step S706 will be executed to determine whether the target logical address of the read command belongs to the second-type trim group or not. If yes, step S708 will be executed to output the target data which value is 0, and step S702 will be executed. If not, step S710 will be executed to obtain the target data from the flash memory 120 based on the mapping table H2F (or the host block mapping table H2F_H) and the target logical address and output the target data. Finally, step S702 will be executed.

Figure 8:
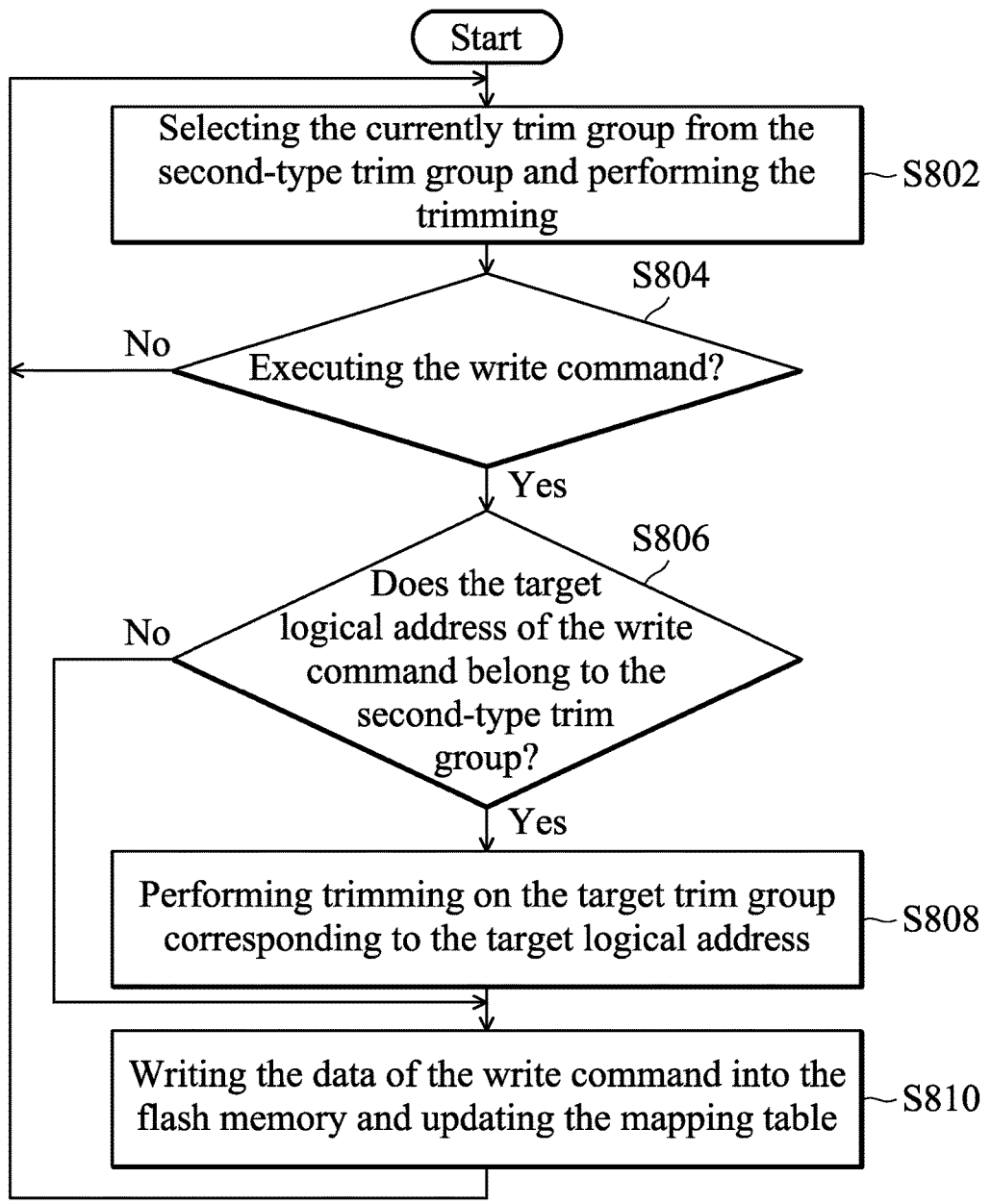
FIG. 8 is a flow chart depicting storage-space trimming in accordance with another exemplary embodiment of the disclosure.

Step S612 could include the following steps as shown in FIG. 8. Step S802 is the same as step S702. The current trim group is selected from the second-type trim group and trimmed. Afterwards, in step S804, whether the write command is executed or not is determined. The write command is preferably from the host 200, or it could be generated by the garbage collection process or the data moving process. If not, step S802 will be executed. If yes, step S806 will be executed to determine whether the target logical address of the write command belong to the second-type trim group or not. If yes, step S808 will be executed to perform trimming on the target trim group (such as the trim group G#2) corresponding to the target logical address. In step S810, the data of the write command is written into the flash memory 120 and the mapping table H2F (or the host block mapping table H2F_H) is updated. If not, step S810 will be executed directly. Finally, step S802 will be executed.

Figure 9:
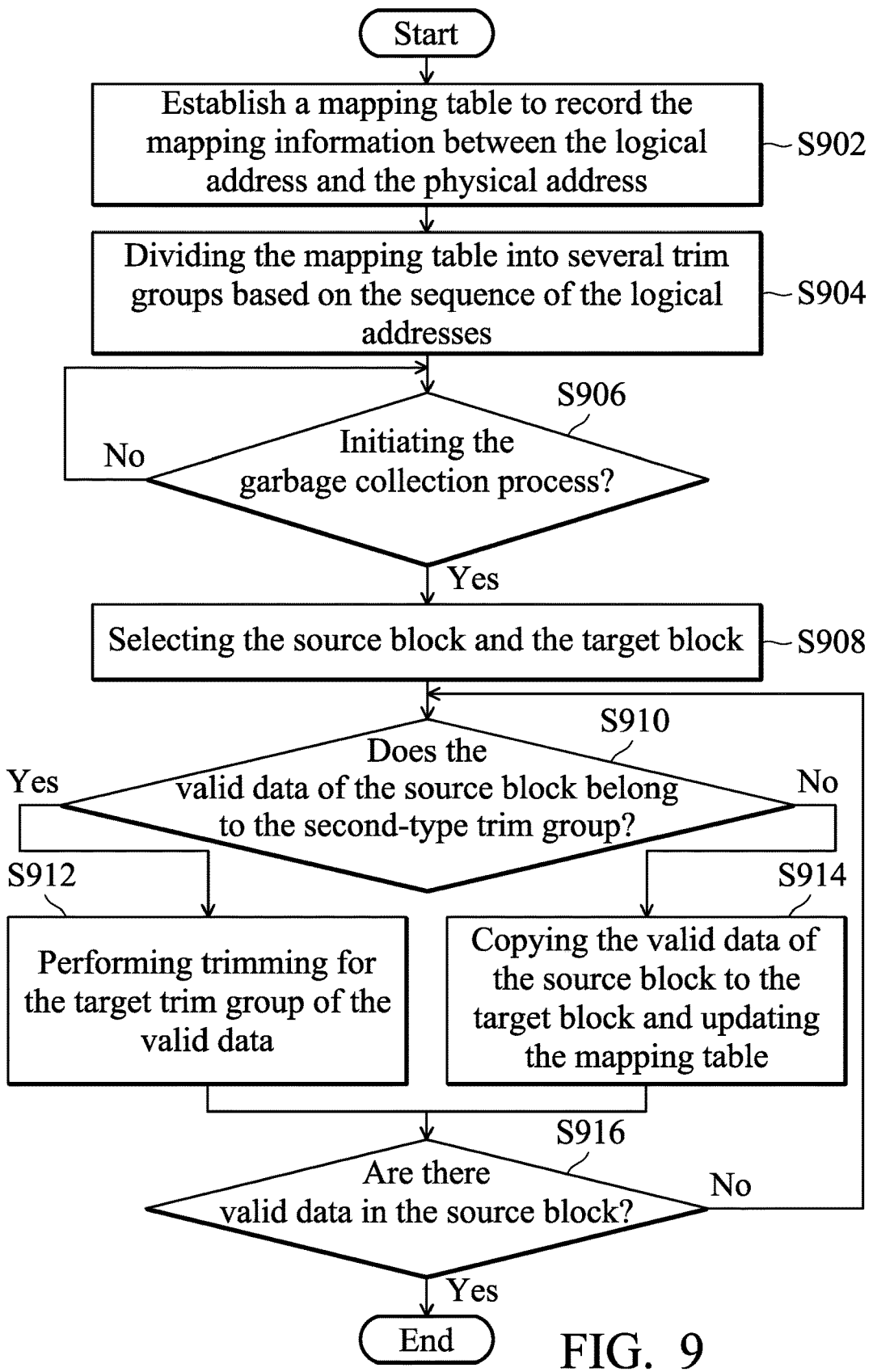
FIG. 9 is a flow chart depicting storage-space trimming in accordance with another exemplary embodiment of the disclosure.

FIG. 9 is a flow chart in accordance with another exemplary embodiment of the garbage collection process. When the garbage collection process is executed, whether the data moving is performed or not is determined by referring to the trim look-up table. Steps S902 and S904 are executed at first. Step S902 is the same as step S602, and step S904 is the same as step S604, therefore they will not be elaborated.

In step S906, whether the garbage collection process is initiated or not is determined. There are many initiating conditions for initiating the garbage collection process. For example, the amount of spare blocks of the data storage device 100 is less than a predetermined value, or the amount of valid data of the data block is less than another predetermined value, or the background mode is executed, or the host 200 transmits commands for requesting the data storage device 100 to enter into the power-saving mode. When any one of the above conditions is met, the garbage collection process could be initiated by the data storage device 100.

In step S908, the source block and the target block are selected. The source block is selected from the resource block pool. The source block is preferably having the least valid data, the longest developing time, the highest erase number, the highest read number. The target block is selected from the spare block pool, and it is preferably having the longest leisure time or the lowest erase number.

In step S910, whether the valid data of the source block belongs to the second-type trim group or not is determined. For example, the logical address L#300 of the valid data belongs to the trim group G#1, and the value of the trim look-up table corresponding to the trim group G#1 is "1". If yes, step S912 will be executed to perform trimming for the target trim group (such as the trim group G#1) of the valid data. Because the data corresponding to the trim group G#1 is invalid data, the data moving will not be performed. If the total amount of valid data of the source block is recorded by the data storage device 100, the total amount of valid data will be decremented by 1. If not, step S914 will be executed for copying the valid data of the source block to the target block and update the mapping table H2F.

In step S916, whether there are still valid data in the source block is determined. If yes, step S910 will be executed to determine whether the valid data of the source block belongs to the second-type trim group. For example, the logical address L#600 of the valid data belongs to the trim group G#2 which is the second-type trim group, and its value of the trim look-up table is "1". In another embodiment, the logical address L#600 of the valid data belongs to the trim group G#0 which is not the second-type trim group, and its value of the trim look-up table is "0". If not, it means that there is no valid data in the source block, and the garbage collection process will be ended.

Other techniques that use the aforementioned concepts to integrate trimming are within the scope of the disclosure. Based on the above contents, the present invention further relates to methods for operating a data storage device.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A data storage device, comprising:
a flash memory; and
a flash memory controller, operating the flash memory to store data, storing a mapping table to record mapping information of a plurality of physical addresses of the flash memory and a plurality of logical addresses, and dividing the mapping table into a plurality of groups;
wherein:
a portion of the groups is first-type trim groups, a portion of the logical addresses recorded by each group of first-type trim groups are included by a trim command, and the flash memory controller performs trimming on the first-type trim groups;

wherein:
a portion of the groups is second-type trim groups, all of the logical addresses recorded by each group of second-type trim groups are included by a trim command.

2. The data storage device as claimed in claim 1, wherein:
after the first-type trim groups have been trimmed, the flash memory controller performs trimming on the second-type trim groups.

3. The data storage device as claimed in claim 1, wherein:
when the data storage device is required to enter into a power-saving mode or a background mode, the flash memory controller performs trimming on the second-type trim groups.

4. The data storage device as claimed in claim 1, wherein:
the size of each of the groups is fixed.

5. The data storage device as claimed in claim 1, wherein:
the flash memory controller further comprises a look-up table to record each of the second-type trim groups.

6. The data storage device as claimed in claim 5, wherein:
an index is utilized by the flash memory controller to point out a record of the look-up table.

7. The data storage device as claimed in claim 1, wherein:
the flash memory controller further records an amount of second-type trim groups.

8. The data storage device as claimed in claim 1, wherein:
when the flash memory controller receives a read command, the flash memory controller outputs a target data whose value is "0" if a target logical address of the read command belongs to the second-type trim groups.

9. The data storage device as claimed in claim 1, wherein:
when the flash memory controller receives a write command, the flash memory controller performs trimming on some of the groups if a target logical address of the read command belongs to some groups of the second-type trim groups.

10. A data storage device, comprising:
a flash memory; and
a flash memory controller, operating the flash memory to store data, storing a mapping table to record mapping information of a plurality of physical addresses of the flash memory and a plurality of logical addresses, and dividing the mapping table into a plurality of groups, wherein a portion of the groups is second-type trim groups, all of the logical addresses recorded by each group of second-type trim groups are included by a trim command;
wherein:
when a garbage collection process is executed, if valid data of a source block belongs to some groups of the second-type trim groups, the flash memory controller performs trimming on some of the groups;
wherein:
after the flash memory controller performs trimming on some of the groups, the flash memory controller does not move the valid data to a target block.

11. The data storage device as claimed in claim 10, wherein:
the source block has a least valid data, a longest developing time, a highest erase number or a highest read number.

12. The data storage device as claimed in claim 10, wherein:
the source block is selected from a resource block pool.

* * * * *